Jan. 21, 1969     K. R. LOHBAUER     3,423,136
PRESSURE MODULATED BRAKE VALVE
Filed May 23, 1967
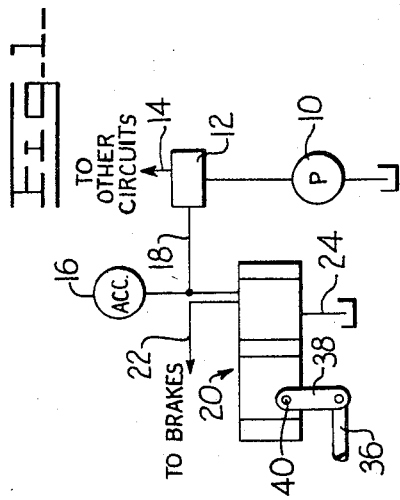
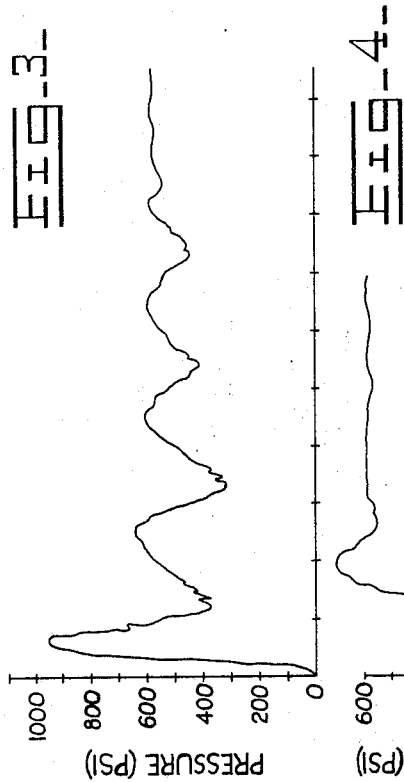
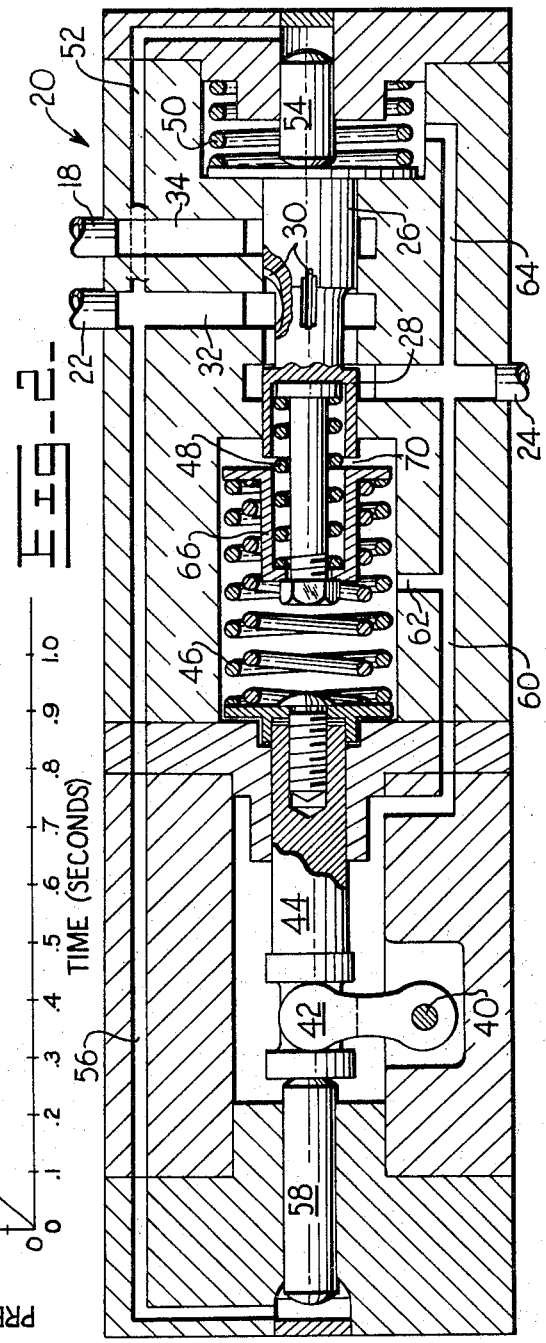
INVENTOR.
KENNETH R. LOHBAUER
BY
ATTORNEYS

United States Patent Office 3,423,136
Patented Jan. 21, 1969

3,423,136
PRESSURE MODULATED BRAKE VALVE
Kenneth R. Lohbauer, Joliet, Ill., assignor to Caterpillar Tractor Co., Peoria, Ill., a corporation of California
Filed May 23, 1967, Ser. No. 640,750
U.S. Cl. 303—54
Int. Cl. B60t 15/04, 13/16
1 Claim

ABSTRACT OF THE DISCLOSURE

A brake valve to insure smooth rather than jerky operation of hydraulically actuated brakes, wherein upon buildup of pressure occurring when the valve is first opened, the valve is urged toward a closed position and assumes a modulating position, which results in slightly slower, smoother brake actuation.

In existing brake valves, pressure between the valve and brake is utilized to close the valve which, in turn, holds the brake in its applied position. If the pressure is too great, it moves the valve toward a position in which it opens a return to the tank. Consequently, pressure applied too suddenly results in a momentary, excessive pressure rise, followed by a fall which occurs when the return to tank is opened, with the consequence that the brake is momentarily released. This occurs rapidly and repeatedly and results in erratic, jerky brake operation, which is highly undesirable.

It is the object of the present invention to provide a brake valve and associated means for automatically modulating flow of fluid toward the brake when the pressure commences to build up, thus reducing the rate of buildup and consequent shock and pressure peak, which causes erratic action. Further objects and advantages of the invention and the manner in which it is carried into practice will become apparent upon reading the following specification, wherein reference is made to the accompanying drawings.

In the drawings:

FIGURE 1 is a schematic illustration of a typical pneumatic brake circuit for a truck or other large vehicle;

FIGURE 2 is a partially schematic sectional view through the brake valve shown in FIGURE 1, and which embodies the present invention;

FIGURE 3 is a graph representative of pressure in a brake system which does not include the present invention; and FIGURE 4 is a similar graph illustrating the results obtained by the use of the present invention.

FIGURE 1 shows a pump 10 for delivering fluid from a reservoir through an accumulator charging valve 12, which is of conventional construction, and thence to other circuits such as steering circuits and the like, through a line 14 and to an accumulator 16 through a line 18. The line 18 also communicates with the present valve, which is shown generally at 20. In one position, the valve 20 directs fluid through a line 22 to brake actuators not shown; and in the other position, it is closed and permits release of pressure from the brake system back through a line 24, which returns to the sump.

The valve is shown in FIGURE 2 as comprising a spool 26 having a land 28 positioned to open and close flow toward the return line 24, and having modulating slots 30 acting between passages 32 and 34 which communicate with lines 22 and 18, respectively. In the position illustrated, the inlet passage 34 is closed and the reutrn passage 24 is open. The spool is actuated as by a brake pedal not shown, through a link 36 and lever 38 shown in FIGURE 1, the lever 38 being connected to a shaft 40, also shown in FIGURE 2. A fork 42 on the shaft 40 fits within a groove in a rod 44, which is reciprocably supported in the housing. When the brake pedal is actuated to swing the fork 42 toward the right, the rod 44 will act through the medium of a spring assembly 46 and a spring 48 to move the valve. These springs have relatively high assembled preload, so that they are not noticeably compressed during movement of the valve spool 26 and compression of a return spring 50 which acts against its opposite end. When the valve is moved to its open position, the slots 30 form communication between the inlet passage 34 and outlet passage 32, and fluid actuating pressure is directed toward the brake. Pressure in the brake system serves two other purposes. It is directed through a passage 52 to the end of a plunger 54, which urges the valve spool toward its normal or closed position. The same pressure, acting through a passage 56, is communicated to one end of a plunger 58, which engages the end of the rod 44 and acts as a booster to reduce operator effort required to hold the brakes in their applied position. With the operator's foot on the pedal, the pressure from behind plunger 54 is insufficient to return the valve to its closed position. When the operator removes his foot from the pedal, the pressure behind the plunger 54 and spring 50 is sufficient to close the valve against the action of the plunger 58. Leakage fluid which might accumulate in the spring chambers and the chamber of the rod 44 is relieved to the sump through passages 60, 62 and 64 provided for that purpose.

The improvements of the present invention reside in the provision of the spring 48 and the use of modulating slots 30 in combination therewith, which slots are designed to provide flow at two rates, depending upon the position of the valve spool. As is apparent in FIGURE 2, each slot has a short, wide portion and a narrower, but longer portion projecting beyond one end thereof. Consequently, when the valve spool 26 is moved toward the right, the distance permitted by the plunger 54, which in this case also acts as a stop, both the narrow and wide slots communicate with intake passage 34 and direct fluid at a relatively high rate toward the brake system. By moving the spool 26 toward the left a limited distance, the longer, narrower slot only will register with intake passage 34, and the rate of flow will be reduced. Because of the initial full flow to fill and partially pressurize the lines to the brake, very little time is lost in providing full brake actuating pressure.

The spring 48 is provided to permit this modulation and acts between a cup-shaped seat 66 of the spring group 46 and the head of a bolt 68 disposed within a recess in the end of the valve spool. The respective forces of the springs 48 and 50 are such that in the absence of fluid pressure behind the plunger 54, spring 48 remains extended and acts as a rigid link. When fluid pressure commences to build up in the brake system, and considerably before it reaches its peak, it acts upon plunger 54 to return the valve spool to the position which closes the gap 70, moves the metering slots to their reduced rate position, yet does not move land 28, which had previously closed the return line, to a position where the line is again opened. Consequently, flow to the brake system is greatly modulated and the excessive, undesirable peak pressure previously referred to is avoided.

The change in brake operation accomplished by the present invention is represented by FIGURES 3 and 4 wherein, as can be observed in FIGURE 3, a pressure peak of more than 900 p.s.i. was reached because of the rapid rate of flow through the valve which was used before the present improvement. This pressure peak, reflected in the chamber of the plunger 54, returned the valve so far that the return line 24 was momentarily opened. Then the springs moved the valve in the opposite direction to again cause pressure rises and drops, as shown in the curve of FIGURE 3. With the improvement, a curve is developed along the lines illustrated in FIGURE 4, wherein at a pressure of approximately 200 p.s.i. in the brake system, the valve spool is moved to its modulating position; and without greatly exceeding 700 p.s.i., the pressure will return to a normal 600 p.s.i. pressure required for setting the brakes.

The mechanism has been described in the process of of applying full brake pressure to bring the vehicle to a stop. Lesser pressure as for retarding speed on a down grade may also be obtained. Initial pressure on the brake pedal moves the spring assembly 46 until the seat 66 engages the end of the housing. This applies the brake with a minimum force. Greater pressure on the brake pedal compresses spring assembly 46, storing more energy to be overcome by plunger 54 and thereby insuring greater pressure at the brakes.

What is claimed is:

1. A valve for controlling fluid pressure to actuate hydraulic brakes comprising a valve having a high rate of flow position and a low rate of flow position, and means responsive to pressure increase in the brake system to move the valve from the high rate to the low rate position, said valve having a spool held in the high rate position by a spring and said means including a plunger actuated by pressure in the brake system to move said spool to a low rate position and said spool having a land which controls flow through a passage, a wide slot in the edge of the land adapted to enter the passage to provide high rate of flow, and a narrow slot extending beyond the wide slot to provide a low rate as the wide slot is withdrawn.

References Cited

UNITED STATES PATENTS

| | | | |
|---|---|---|---|
| 1,343,375 | 6/1920 | Peppercorn | 251—205 |
| 2,718,437 | 9/1955 | Henning | 303—54 |
| 3,294,112 | 12/1966 | Watkins | 137—495 |

MILTON BUCHLER, *Primary Examiner.*

JOHN J. McLAUGHLIN, *Assistant Examiner.*

U.S. Cl. X.R.

137—625.3, 625.67; 303—10, 87